United States Patent Office 3,430,998
Patented Mar. 4, 1969

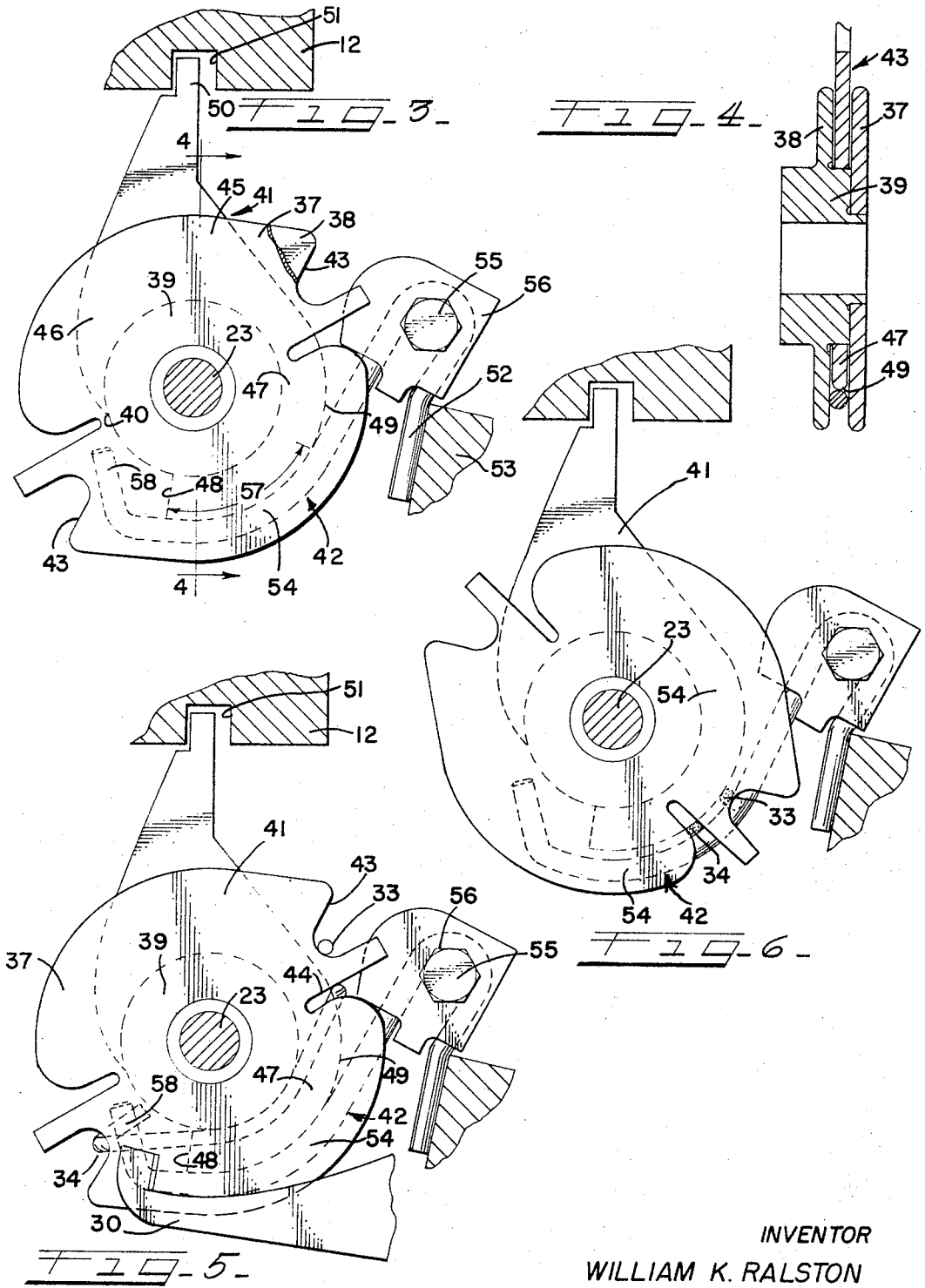

3,430,998
CORD HOLDER KEEPER
William K. Ralston, Memphis, Tenn., assignor to International Harvester Company, Chicago, Ill., a corporation of Delaware
Filed Oct. 5, 1967, Ser. No. 673,172
U.S. Cl. 289—14    5 Claims
Int. Cl. B65h 69/04

ABSTRACT OF THE DISCLOSURE

A cord holder assembly for use in a twine knotter mechanism and having a pair of axially spaced, notched disks flanking a cleaner plate and a flexible keeper spring. The assembly is rotatable between a first position wherein the disks' notches are disposed for receiving a strand, and a second position wherein the disks' notches cooperate with the keeper spring to securely grip the received strand. The cleaner plate presents a contact surface positioned to cooperate with the keeper spring to retain the strand as the assembly moves from the first to the second position.

Background and summary of the invention

This invention relates generally to knotter mechanisms and more particularly to cord holders used in knotter mechanisms. The conventional hay baler is provided with a pair of knotter mechanisms which simultaneously tie together opposite ends of a pair of twine strands encircling a bale formed in the baler. The knotting operation is the final step in the baling process and binds the bale into a self-sustaining bundle. Although the baler is generally provided with two of such knotters, for purposes of this invention it is sufficient that only one be described.

The components of the knotting mechanism comprise generally the drive parts, the needle assembly, the knotter hook assembly, and the cord holder. The entire mechanism is assembled for coordinated operation and functions according to a predetermined sequence.

This invention concerns the cord holder assembly, the function of which is to hold opposite ends of a twine strand encircling the formed bale during the tieing cycle.

The typical cord holder assembly comprises a pair of axially spaced, notched disks and a keeper blade interposed between the disks. The cord holder assembly has a home position wherein one set of notches is disposed to receive needle twine delivered by a baler needle. As delivered to the assembly, the needle twine spans the space between the notched disks so that upon rotation of the assembly, the twine is squeezed between the keeper blade and the disks, thereby forming a kink in the twine. The squeezing force in effecting the kink is sufficient to securely hold the twine during the tieing cycle. The grip of the keeper blade on the twine between the inwardly facing surfaces of the disks depends to a large extent on the twine thickness or twine characteristics. In the past, in order to attain the proper grip it has been necessary to adjust the axial spacing of the disk to conform to the twine thickness or characteristics.

The purpose of the present invention is to provide a keeper which inherently compensates for variations in twine thickness or characteristics. In order to achieve this end, the keeper is made in the form of a wire spring and is biased radially inwardly with respect to the axis of the disks. The gripping force created by squeezing the twine between the keeper and the disks is opposed by the bias force of the spring so that when the proper grip is obtained, the keeper yields. For example, with relatively thin twine, the gripping force between the keeper and the gripping surfaces of the disks is small resulting in a considerable amount of spring deflection; but with relatively thick twine, the gripping force is greater resulting in a small amount of deflection. It will thus be appreciated that the spacing between the disks may be maintained at a constant setting, a feature which increases the versatility of the knotting mechanism.

During the tieing cycle, one of the twine strand ends is released from the grip of the cord holder while the other end is securely gripped. It is desirable that the cord assembly retain a slight grip on the released end as the knot is formed. It is therefore an additional feature of this invention to provide an arm interposed between the disks and engageable with the keeper for clamping the released end therebetween while the knot is being formed.

The objects of this invention may be briefly summarized as follows:

To provide a cord holder capable of handling a variety of twines;

To provide a cord holder equipped with a flexible keeper for retaining twine; and To provide a cord holder capable of retaining a slight grip on the held end during the formation of the knot.

These and other objects will become apparent to those skilled in the art from the following disclosure taken in conjunction with the drawings.

Brief description of the drawings

FIGURE 3 is a plan view of the cord holder assembly shown detached from the knotter mechanism;

FIGURE 4 is a sectional view of the cord holder assembly taken generally along line 4—4 of FIGURE 3;

FIGURE 5 is a plan view of the cord holder assembly shown in its home position, and FIGURE 6 is another plan view similar to FIGURE 5 showing a subsequent step in the cord holder operation.

Disclosure of the preferred embodiment

Figure 1:
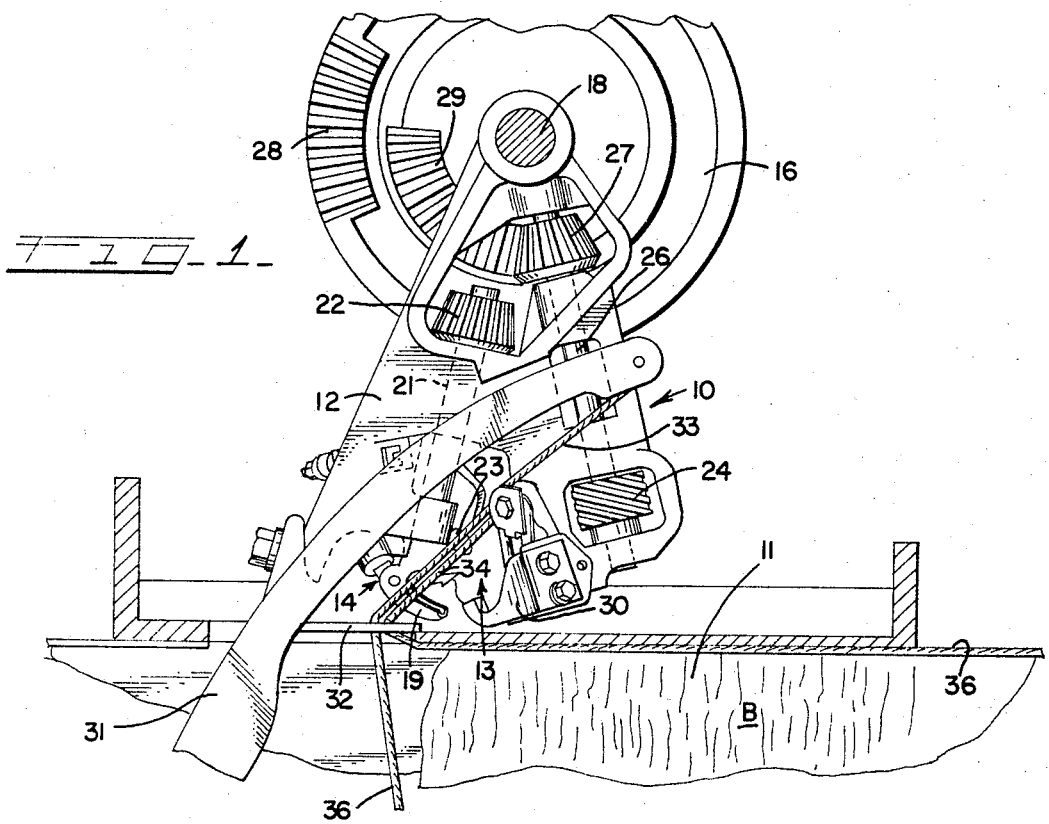
FIGURE 1 is a side elevational view of a knotter mechanism shown mounted on a baler.

Referring to FIGURE 1, a knotter mechanism 10 is shown mounted above a baling chamber 11 of a conventional baler. The components of the knotter mechanism 10, which include a cord holder assembly 13, a knotter hook assembly 14, and a cam disk 16, are supported on a frame 12. The cam disk 16 is keyed to a knotter shaft 18 which in turn is journaled to frame 12.

The knotter hook assembly 14 includes a knotter hook 19, a bevel gear 22 and a shaft 21. The shaft 21, journaled to the frame 12, interconnects the hook 19 and the bevel gear 22 so that rotation of the bevel gear 22 imparts rotary movement to the knotter hook 19.

The cord holder assembly 13 is mounted at the lower end of a shaft 23 which is drivingly connected to the cam disk 16 through an assembly comprising a pair of helical pinions 24, 24 (one only shown), a shaft 26, and a bevel pinion 27. The knotter hook gear 22 and the cord holder pinion 27 are respectively aligned to mesh with segmental gears 28 and 29 formed in the cam disk 16.

A knife 30 bolted to the frame 12 is cooperatively arranged with the cord holder assembly 13 and functions to cut the needle twine during the tieing cycle.

The knotter hook assembly 14 and the cord holder assembly 13 are arranged to operate in cooperation with a needle 31 which is operatively connected to knotter shaft 18 by conventional means (not shown). Thus, it will be appreciated that revolvement of the cam disk 16 one revolution actuates the knotter mechanism 10 through one tieing cycle.

The needle 31 passing through the bale chamber 11 delivers a needle end strand 33 to the cord holder assembly 13. The strand 33 is laid adjacent a strand 34 held by the cord holder assembly 13. The strand ends 33 and 34 represent opposite ends of a strand 36 encircling a bale B and, at the beginning of the tieing cycle, are positioned between the cord holder assembly 13 and a breastplate 32.

Figure 2:
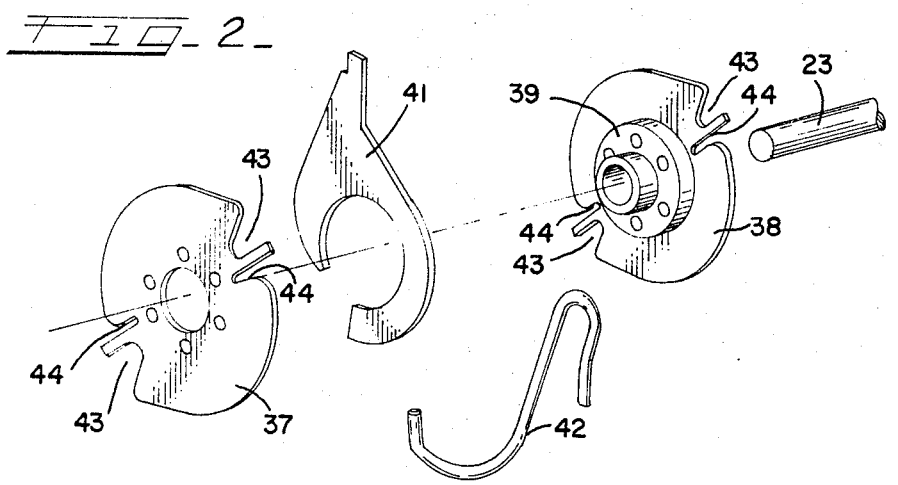
FIGURE 2 is an exploded view of the cord holder assembly incorporated in the mechanism shown in FIGURE 1.

As best seen in FIGURE 2, the cord holder assembly 13 comprises a pair of axially spaced disks 37 and 38, a keeper spring 42, and a cleaner plate 41. The components are mounted on the shaft 23 in an arrangement wherein disk 37 is in front and disk 38 is in the rear (as viewed in FIGURE 2) and the keeper spring 42 and cleaner plate 41 are interposed in the space between the disks 37 and 38. A hub 39 integrally formed in the rear disk 38 provides the means for attaching the front disk 37 to the rear disk 38 and provides for the axial spacing between the disks. For purposes of this invention, the disks 37 and 38 may be considered identical except for the hub 39 previously mentioned. Each of the disks 37 and 38 are formed with two pairs of diametrically opposed notches 43 and 44, the notches 43 and 44 of the front disks 37 being axially aligned with those of the rear disk 38. The notches 43 may be characterized as wide and shallow, and the notches 44 as narrow and deep.

Referring to FIGURES 3 and 4, the cleaner plate 41 is generally a bifurcated member having a main body 45 and a pair of arms 46 and 47. The area between the furcations 46 and 47 is circular in configuration to conform to the circumference of the hub 39. The longer, curved arm 47 wraps around the hub 39 extending substantially between the two wide, shallow notches 43, 43 terminating at end 48. The arm 47 presents a radially outwardly facing, curved surface 49, the center of curvature of which is located on the axis of the shaft 23. The radius of curvature of arm 47 is slightly less than the radial location of wide, shallow notches 43 but greater than that of the deep narrow notches 44. The surface 49 constitutes a contact surface disposed to engage keeper spring 41 and may be beveled as shown in FIGURE 4.

The shorter arm 46, extending around the hub 39 in the opposite direction from arm 47, provides a scraper edge 40 for preventing build-up of debris in the space between the disks 37 and 38. A tail portion 50 integrally formed in the body 45 anchors the cleaner plate 41 in a recess 51 formed in the frame 12. Thus it will be appreciated that the cleaner plate 41 is supported in a fixed position solely by its engagement on the hub 39 and the frame 12.

The keeper spring 42 is adapted to the assembly to provide two functions: (1) to grip the strand end 34 after being cut by the knife 30 (see FIGURE 6), and (2) to retain the strand end 34 after being released (see FIGURE 5). As shown in FIGURE 3, the U-shaped configuration of the keeper spring 42 provides one arm 52 assembled in abutting relation with a shoulder 53 formed in the frame 12, and another arm 54 projecting into the space between the disks 37 and 38. A bolt 55 and guide 56 secures the keeper spring 42 to the frame 12. The arm 54 is curved to conform to the contact surface 49 in the segment denoted by 57. The keeper spring 42 is assembled with the arms 52 and 54 slightly flexed inwardly so that a preload force is imposed by arm 54 on the contact surface 49 in the area of segment 57.

The distal end of the arm 54 is characterized by an inward projection 58. Note that the projection 58 is situated beyond the extent of segment 57 and adjacent the wide, shallow notch 43. The cutting edge of knife 30 is disposed in the path of twine carried in the shallow notches 43, 43 and slightly in advance of the projection 58. Thus it will be appreciated that the strand 33 carried in the shallow notches 43, 43 first engages the knife 30 and then the projection 58. This engagement creates a gripping force by kinking the strand 33 between the disks 37 and 38. The force created is a function of the strand thickness and characteristics, e.g., coefficient of friction, and is opposed by the inwardly biased spring arm 54. Now, when the gripping force exceeds the preload force of the keeper spring 42, arm 54 yields radially outwardly. Thus, the inherent spring characteristic of the keeper spring 42 automatically compensates for variations in the strand thickness and strand characteristics.

The operation of the cord holder assembly 10 will be described with reference to FIGURES 1, 5, and 6. Let it be assumed that the assembly is in the home position (FIGURE 5) and that the end 34 is held gripped between the keeper 41 and the disks 37 and 38. Strand 34 extends over the rear disk 38 through the deep narrow notch 44, and thence around the breast-plate finger. Now, as the bale is completed, the cam disk 16 is actuated revolving the shaft 18 which first actuates the needle 31 to deliver strand 33 to the cord holder 13 assembly. Strand 33 is placed in the aligned notches 43, 43 of disks 37 and 38. This places strand ends 33 and 34 in a side-by-side relation between the cord holder assembly 13 and the breast-plate 32. Through the timing effected by segmental gear 28, the knotter hook assembly 14 is next actuated sweeping the adjacent strands 33 and 34 from the breastplate finger 32 while at the same time the cord holder assembly begins revolving through its steplike cycle of 180°. Initial rotary movement moves the held end 34 past the projection 58 releasing the grip of the cord holder assembly 13. As shown in FIGURE 6, further revolvement causes the strands 33 and 34, respectively, carried in the wide, shallow notch 43 and the deep narrow notch 44, to be squeezed between the keeper spring 42 and the contact surface 49 of the cleaner plate 41. The force of keeper spring 42 acting on the contact surface 49 maintains a slight grip on the released end 34 as it is carried through segment 57 and thus prevents the released end from interfering with the operation of the other knotter parts. Still further revolvement of the disks 37 and 38 carries the strands 33 and 34 past arm end 48 releasing strand 34 which now may be pulled free of the disks through the deep, narrow notch 44. Now as the disks 37 and 38 approach their home position (FIGURE 5), strand 33 which by this time has been severed from the needle twine by the knife 30, engages the projection 58. Continued revolvement of the disks 37 and 38 causes the projection 58 to kink the strand 33 between the disks 37 and 38. Thus, when the assembly reaches its home position, the strand 33 is firmly gripped between the disks 37 and 38 by the radially inwardly biased keeper 42. In this position the assembly is ready for a succeeding bale.

Although the preferred embodiment of this invention has been described in particular detail, it should be observed that modifications and variations may be incorporated therein.

What is claimed is:
1. A cord holder for use in a knotter mechanism, said cord holder comprising:
   a rotatable assembly having a pair of axially spaced disks, said disks including aligned peripheral notches for receiving strand, said assembly being movable between a strand receiving position and a strand holding position,
   a keeper interposed between said disks and cooperatively arranged with said notches for retaining strand spanning the space between said notches with said assembly in said holding position, said keeper including a flexible portion biased radially inwardly from said notches with said assembly in said strand holding position.

2. A cord holder as recited in claim 1 and further comprising:
   an arm interposed between said disks, said arm presenting a radially outwardly facing contact surface arranged to cooperate with said flexible portion for retaining strand as said assembly moves from said receiving position to said holding position.

3. A cord holder for use in a knotter mechanism, said cord holder comprising:

a frame;

a disk assembly rotatably mounted on said frame and including a pair of axially spaced, notched disks, said assembly being rotatable between a first position wherein said notches are disposed to receive a strand, and a second position wherein said notches are disposed to hold said received strand;

a keeper spring having one end fixed to said frame and another, distal end interposed between disks, said distal end being arranged to grippingly kink strand carried in said notches between said disks with said assembly in said second position, said keeper spring being biased generally radially inwardly of said disks and yieldable when a predetermined gripping force on said strand is obtained.

4. A cord holder as recited in claim 2 and further comprising:

a member having an end anchored to said frame and an arm interposed between said disks, said arm presenting a radially outwardly facing contact surface arranged to cooperate with said keeper spring for retaining strand carried by said notches as said assembly moves from said first position to said second position.

5. A cord holder as recited in claim 4 wherein said keeper spring includes a flexible arm having a portion shaped to conform to said contact surface, said arm being biased against said contact surface to provide a gripping force for strand carried therebetween.

References Cited

UNITED STATES PATENTS

| 3,214,206 | 10/1965 | Sullivan et al. | 289—14 |
|---|---|---|---|
| 3,305,257 | 2/1967 | Grillot | 289—14 |
| 3,321,224 | 5/1967 | Bledsoe | 289—14 |

LOUIS K. RIMRODT, *Primary Examiner.*